United States Patent [19]

Croopnick et al.

[11] 4,132,649

[45] Jan. 2, 1979

[54] GASKET ARRANGEMENT FOR PURIFICATION APPARATUS

[75] Inventors: Gerald A. Croopnick, Laguna Hills; John M. Michaels; Donald G. Paul, both of Irvine, all of Calif.

[73] Assignee: Dresser Industries, Inc, Dallas, Tex.

[21] Appl. No.: 781,761

[22] Filed: Mar. 28, 1977

[51] Int. Cl.² ............................................. B01D 31/00
[52] U.S. Cl. ................................ 210/347; 210/321 R; 210/433 M; 210/450; 210/488
[58] Field of Search ................... 210/321 R, 331, 347, 210/445, 450, 453, 488, 433 M

[56] References Cited

U.S. PATENT DOCUMENTS

| 3,398,833 | 8/1968 | Marks et al. ...................... 210/347 X |
| 3,398,834 | 8/1968 | Nuttall et al. ...................... 210/321 R |
| 3,456,805 | 7/1969 | Jarvis et al. ....................... 210/321 R |
| 3,556,302 | 1/1971 | Agranat ............................ 210/321 R |
| 3,623,610 | 11/1971 | Olsen et al. ........................ 210/321 R |
| 3,782,083 | 1/1974 | Rosenberg ........................ 210/445 X |

FOREIGN PATENT DOCUMENTS

| 1163580 | 9/1958 | France ...................................... 210/488 |
| 1210052 | 3/1960 | France ...................................... 210/488 |

*Primary Examiner*—Robert H. Spitzer
*Attorney, Agent, or Firm*—Freilich, Hornbaker, Wasserman, Rosen & Fernandez

[57] ABSTRACT

A fluid purification apparatus of the type which includes a stack of membrane packs and a stack of gaskets located at the peripheral portions of the membrane packs to keep them separated from one another, wherein the gaskets have outer lands bearing on one another and surrounding the membrane packs, inner lands pressing against the faces of the packs to seal against them, and elongated bendable middle gasket portions connecting the inner and outer lands to allow the inner lands to adjust position so as to compensate for variations in thickness of the membrane packs.

6 Claims, 5 Drawing Figures

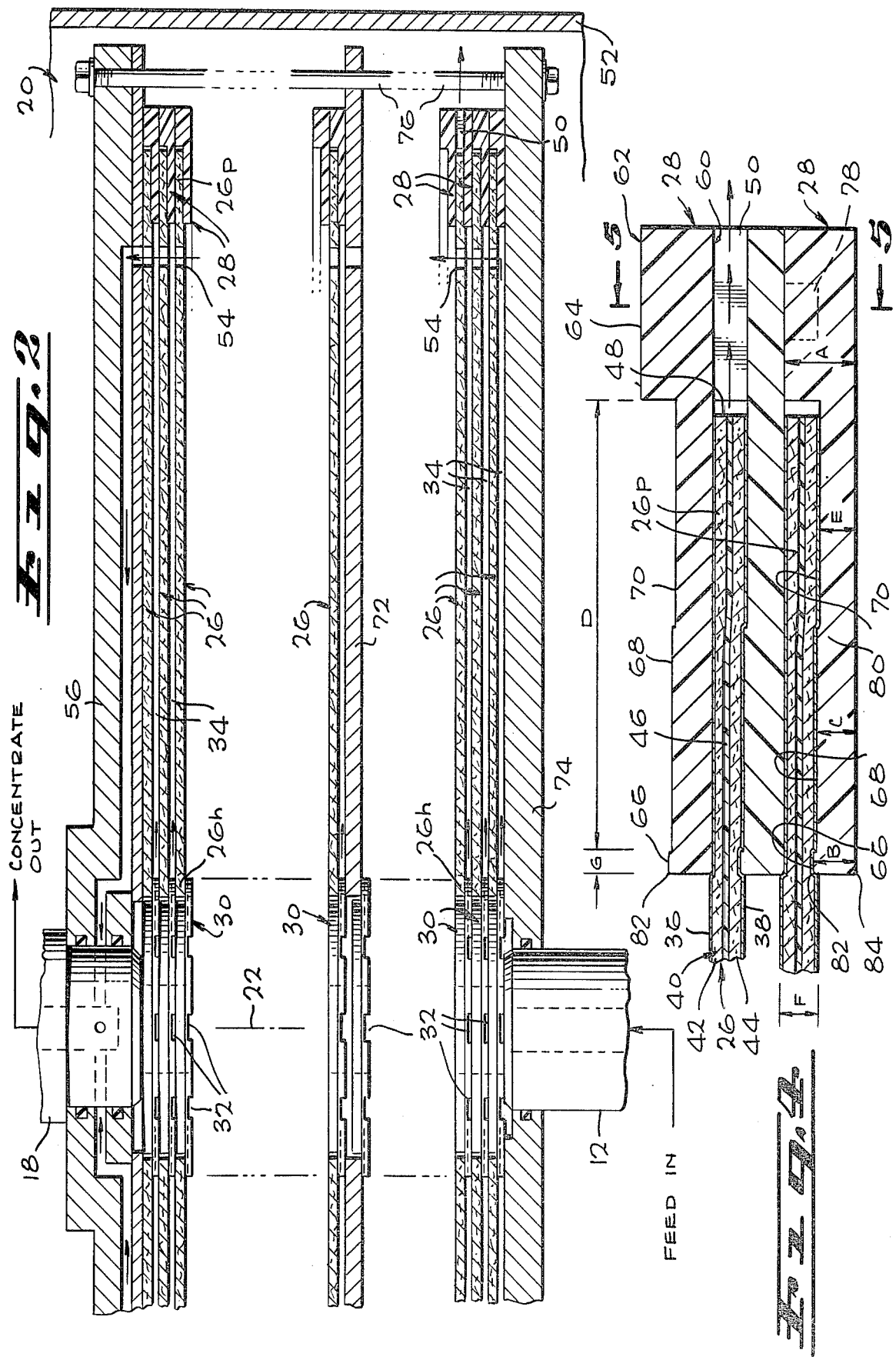

GASKET ARRANGEMENT FOR PURIFICATION APPARATUS

BACKGROUND OF THE INVENTION

One purification apparatus described in our earlier U.S. Pat. No. 4,025,425 includes a stack of membrane packs and a stack of gaskets interspersed with the peripheral portions of the packs to keep the packs slightly separated. Highly pressurized feed fluid flows through the spaces between the packs, and pure fluid, or permeate, passes through the membrane of the pack and then moves to the periphery of the pack where the permeate flies out and is collected. The entire assembly may be rapidly rotated to create centrifugal forces that aid in the flow of fluid. The high pressure and vibrations present during operation require that the gaskets and membrane packs be assembled so as to provide a rugged container-like structure, with the gaskets applying enough pressure to the packs to hold in feed fluid but without cutting the packs, and with the gaskets securely holding to each other.

SUMMARY OF THE INVENTION

In accordance with one embodiment of the present invention, a purification apparatus is provided which utilizes a gasket arrangement for separating membrane packs from one another and for providing a container that holds in pressurized fluid, wherein the gasket arrangement can be constructed at modest cost and operates reliably. The gaskets have outer lands that extend along most of the periphery of the gasket and that bear on one another, to withstand high compressive loading that forms the gaskets into a reliable container. The gaskets also have inner lands that bear against the faces of the membrane packs to form seals against them, that prevent the outward leakage of pressurized feed fluid that is passing over the membrane packs. Accordingly, the degree of compression of the membrane packs depends upon the thickness of the inner gasket lands, rather than on the compressive force applied to the stack of gaskets, so that the gaskets can be placed under a higher compressive loading than the membrane packs. In order to account for the variations in thickness of the membrane packs, each gasket has an elongated middle portion connecting the inner and outer lands, to permit the inner lands to shift upward or down slightly so as to accomodate such variations in pack thicknesses.

The novel features that are considered characteristic of this invention are set forth with particularity in the appended claims. The invention will best be understood from the following description when read in connection with the accompanying drawings.

BRIEF DESCRIPTION OF THE DRAWINGS

FIG. 2 is a view taken on line 2—2 of FIG. 1;

FIG. 4 is an enlarged view of a portion of the apparatus of FIG. 2.

DESCRIPTION OF THE PREFERRED EMBODIMENTS

Figure 1:
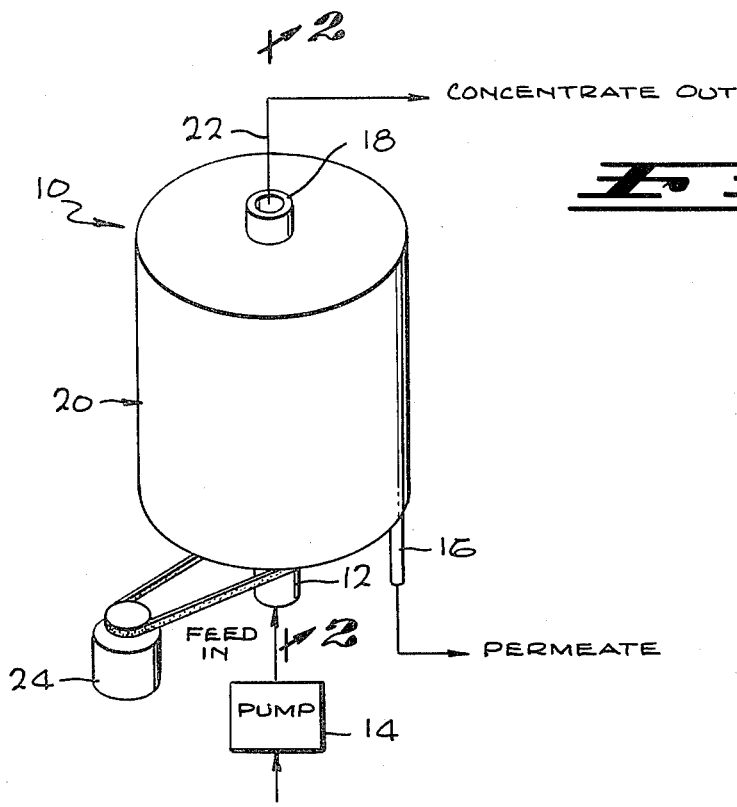
FIG. 1 is a perspective view of a separation apparatus constructed in accordance with the present invention.

FIG. 1 illustrates a separation or purification apparatus 10 which includes a feed fluid inlet 12 which receives a feed fluid such as impure water from a pump 14, a permeate outlet 16 through which a permeate such as fresh water is obtained, and a concentrate outlet 18 through which a concentrate such as very impure water is delivered. The apparatus includes a rotor 20 rotatably mounted on an axis 22, and rotated by a motor 24.

As illustrated in FIG. 2, the rotor includes a stack of membrane packs 26 with peripheral portions 26p spaced apart by a stack of gaskets 28, and with hub portions 26h spaced apart by a stack of separators 30. Feed fluid which enters at inlet 12, passes through axial grooves 32 of the separators into the spaces 34 between the membrane packs. As illustrated in FIG. 4, each membrane pack includes a pair of membranes 36, 38 and a carrier 40 between the membranes. The particular carrier 40 which is illustrated includes a pair of sheets of filter paper 42, 44 and a central sheet 46 formed of a sheet of embossed plastic. Fresh water under pressure can permeate (by filtration or reverse osmosis) through the membranes 36, 38 and flow radially outwardly through the carrier 40 to the peripheral edge 48 of the membrane pack. The permeate then can flow radially outwardly through slots 50 in the gaskets, where the permeate is captured by a shell 52 (FIG. 2). Feed fluid which does not permeate the membrane packs, passes through aligned holes 54 in the packs to a top plate 56 of the rotor, and then out through the concentrate outlet 18.

The gaskets 28 must serve several functions besides separating the peripheral portions of the membrane packs. The stack of gaskets must serve as a reliable shell which will remain intact despite the forces resulting from rapid rotation, vibrations, and large pressures from the pressured water contained by the stack of gaskets. The gaskets must also form a seal against the peripheral portions 26p of the membrane packs to prevent the outward leak of feed fluid which lies in the space 34 between membrane packs, even though this fluid may be under a high pressure such as 400psi. Any leaked feed fluid would contaminate the permeate which has reached the outside portion of the rotor only by moving through the membranes of the membrane packs. These functions of the gasket stack must be accomplished without applying excessively large compressive forces to the membrane packs which could damage them.

In accordance with the present invention, each of the gaskets 28 is formed as a ring with a bottom face 60 that is flat, and with an opposite face 62 that is formed with several different regions of differing heights above the bottom face 60. These regions include an outer land 64, an inner land or sealing ring 66, a raised transition area 68, and a depressed intermediate area 70. The gaskets are assembled with the membrane packs lying within the outer lands 64, so that the outer lands 64 of the gaskets are disposed against one another. After a stack of perhaps several hundred gaskets has been assembled, with a steel plate 72 between every group of about 40 gaskets, the stack is compressed between two end plates 56, 74, by means of about eighteen uniformly spaced bolts 76.

Figure 3:
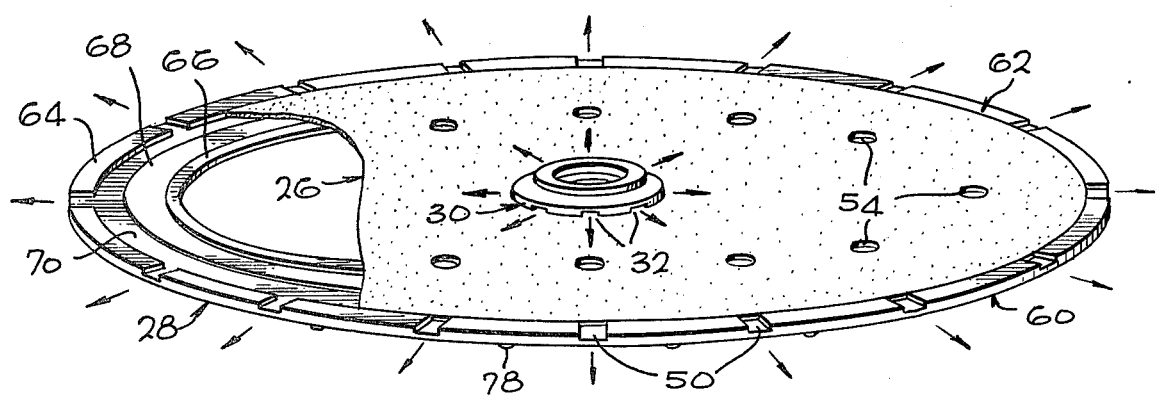
FIG. 3 is a perspective of a portion of the apparatus of FIG. 2.
Figure 5:
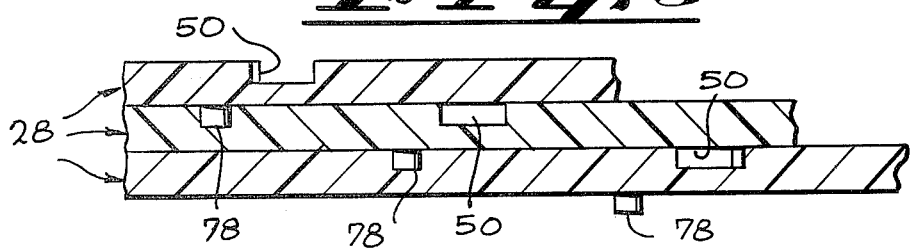
FIG. 5 is a view taken on the line 5—5 of FIG. 4.

The outer land 64 of each gasket extends along most of the gasket periphery, with several small slots 50 (FIG. 3) therein to permit the outflow of permeate. Each gasket has several bosses 78 (FIG. 4) on its lower face which are received in corresponding holes in the upper face of the gasket, to accurately position the gaskets on one another and assure that the slots 50 of adjacent gaskets do not lie over one another. The bolts 76 are tightened sufficiently to force the gaskets against one another at their outer lands 64 with a pressure of about 1000psi, which is reduced to about 400psi when the rotor contains highly pressurized fluid at about 400psi. The high pressure of the gaskets on one another causes the stack of gaskets to reliably hold together by reason of their frictional engagement, without the need for welding or adhesives to hold the gaskets to one another.

The sealing of the gaskets 28 to the peripheral portions 26p of the membrane packs, is accomplished at the inner land 66 of each gasket. The relatively narrow inner land 66 enables a large pressure to be applied to the membrane pack 26 to form a good fluid-tight seal therewith, without requiring the application of excessively large compressive forces to the gasket stack. It may be noted that the distance D between the inner and outer lands 66, 64 is a plurality of times greater than the average thickness of the gasket portion 80 which connects the two land regions. This permits the connecting region 80 to bend slightly, so that the inner land 66 moves up or down to accommodate membrane packs of various thicknesses. For example, the thickness of the gaskets at the lands 64 and 66 may vary by up to 1 mil (1/1000th inch), while the thickness of each gasket 26 may vary by many times as much. If an excessively thick membrane pack were squeezed by an inner land 66 to a predetermined thickness suitable only for thinner membrane packs, then the thicker membrane pack might be cut by the land. On the other hand, if the inner land were made thinner, then a membrane pack much thinner than normal might not be pressed hard enough by the inner land to form a good seal, which could cause a leakage of feed fluid. Instead, the inner land areas of the gaskets can flex up or down slightly so as to accommodate membrane packs of different thicknesses so as to apply roughly equal pressures to all membrane packs.

The raised transition area 68 which lies immediately outside the inner land 66, has a height which causes it to only moderately compress the membrane pack region lying against it. This transition area 68 serves to provide a large area of moderate pressure against the membrane packs, which provides sufficient friction to securely hold the membrane packs in position. This distributed pressure over the wide raised area 68 is desirable, because membrane packs are only partially elastic, so that good frictional contact is best maintained by applying contact over a wide area of the pack. A depressed area 70 serves to relieve pressure on the membrane pack located thereat, so that more pressure can be applied at the raised area 68.

In one purification apparatus, gaskets 28 of 25 inch outside diameter are utilized, which have an outer land thickness A of 150 mils, an inner land thickness B of 102 mils, a raised area thickness C of 90 mils, and a depressed area thickness E of 70 mils. The average membrane pack had a thickness F of 70 mils when uncompressed, and therefore was compressed to 48 mils at the inner land 66. It may be noted that in constructing the gaskets, care is taken to round the inner gasket at the corners 82, 84, to avoid cutting of the membranes thereat. The gaskets were constructed of plastic with a Youngs modulus of about 700,000psi. The filter paper of the membrane packs, and therefore the membrane packs, had an apparent Youngs modulus of about 4000psi at a loading of 400psi, and therefore, was compressively much less stiff than the gaskets.

Thus, the invention provides a purification apparatus with a stack of gaskets for separating membrane packs of the apparatus and for forming a reliable container for holding in the feed fluid that is applied to the membranes of the membrane packs. This is accomplished by utilizing gaskets with outer land portions that extend around most of the circumference of the gaskets, and that bear against one another without the membrane packs lying between them, to thereby assure that the stack of gaskets will reliably hold together while providing a rigid container which is capable of withstanding lateral vibrational loads occurring during rotation. The gaskets have inner portions that bear against the faces of the membrane packs to seal against them, so that the sealing portions of the gaskets are not in line with the outer gasket portions that must withstand the high compression that assures the integrity of the stack. The sealing portions, or inner lands, of the gaskets are preferably formed at a substantial distance within the outer lands, with an elongated intermediate region 80 connecting them, to permit the sealing portions to move up or down slightly so as to accommodate membrane packs of varying thicknesses. The inner land or sealing ring 66, is preferably narrow to concentrate the sealing forces. A raised area 68 is preferably provided to only moderately compress the membrane pack so as to provide high friction that prevents shifting of the pack.

Although particular embodiments of the invention have been described and illustrated herein, it is recognized that modifications and equivalents may readily occur to those skilled in the art, and consequently it is intended that the claims be interpreted to cover such modifications and equivalents.

We claim:

1. Purification apparatus comprising:
    a stack of membrane packs;
    a stack of gaskets having radially outer portions surrounding said packs and radially intermediate and inner portions integral with the outer portions, said inner portions disposed between adjacent packs to separate them, each gasket forming an outer land at its outer gasket portion, which extends along most of the periphery of the gasket, and said outer lands of said gaskets bearing on one another, the inner portion of each gasket having a thickness less than the outer portion of the gasket but great enough so that said membrane packs are compressed between the inner portions of adjacent gaskets; and
    means for maintaining said stack of gaskets in compression, whereby a high pressure of the gaskets on one another can be established, largely independently of the compression of the membrane packs which is largely determined by the thickness, and therefore spacing, of the inner gasket portions.

2. The apparatus described in claim 1 wherein:
    each of said gaskets has a raised inner land at said inner portion and said intermediate region between said inner and outer lands has a length at least twice its average thickness, whereby to enable slight bending of said intermediate region to accommodate variation of pack thicknesses.

3. In a fluid purification structure which includes a stack of membrane packs, the improvement of a container comprising:
    a stack of gaskets having radially outer land portions bearing on one another, integral intermediate portions, and integral radially inner land portions disposed between adjacent packs of said stack of packs and pressing firmly against said packs to form fluid seals therewith, the gasket portion outside the inner land portions being recessed so that the inner land applies a large pressure to an adjacent pack to form a seal against the pack that prevents the outflow of fluid that lies between the packs.

4. The improvement described in claim 3 wherein: the intermediate portion of each gasket has a radial length at least twice the average thickness of said intermediate portion, whereby to enable the intermediate portion to bend slightly to accommodate membrane packs of varying thickness between the inner land portions.

5. The improvement described in claim 3 wherein: the intermediate portion of each gasket includes a transition area immediately outside said inner land portion, and said gaskets are constructed with the space between gaskets at said transition area being closer together than the uncompressed thickness of each pack portion lying thereat, so that the pack portions lying against said transition areas are partially compressed to provide good frictional contact therewith.

6. A purification apparatus comprising:
a stack of membrane packs, each including a carrier and a pair of membranes covering opposite faces of the carrier to permit only the permeate portion of a fluid lying between membrane packs to flow into the carrier, the periphery of said carrier being open to the outflow of fluid therefrom;
a stack of gaskets having radially outer portions bearing on one another and surrounding said membrane packs, having integral intermediate gasket portions, and having integral radially inner portions disposed between adjacent membrane packs, the thickness of said inner gasket portions being less than that of the outer gasket portions to provide space for the membrane packs therebetween, but the thickness of said inner gasket portions being great enough to press firmly against said membrane packs to form fluid seals thereagainst as a result of such firm pressing that prevents the radially outward leakage of fluid that lies between adjacent membrane packs; and
means for applying fluid to the regions between membrane packs.

* * * * *